United States Patent
Aarskog

(10) Patent No.: US 9,666,367 B2
(45) Date of Patent: May 30, 2017

(54) REMOVING FAULTS FROM A SELF-HEALING FILM CAPACITOR

(71) Applicant: Fredrik Gundersen Aarskog, Trondheim (NO)

(72) Inventor: Fredrik Gundersen Aarskog, Trondheim (NO)

(73) Assignee: Siemens Aktiengesellschaft, München (DE)

(*) Notice: Subject to any disclaimer, the term of this patent is extended or adjusted under 35 U.S.C. 154(b) by 121 days.

(21) Appl. No.: 14/572,089

(22) Filed: Dec. 16, 2014

(65) Prior Publication Data
US 2015/0170839 A1    Jun. 18, 2015

(30) Foreign Application Priority Data
Dec. 16, 2013  (EP) ..................................... 13197486

(51) Int. Cl.
  *H01G 4/015*  (2006.01)
  *H01G 2/10*  (2006.01)
  *H01G 4/224*  (2006.01)

(52) U.S. Cl.
  CPC .............. *H01G 4/015* (2013.01); *H01G 2/10* (2013.01); *H01G 4/224* (2013.01)

(58) Field of Classification Search
  None
  See application file for complete search history.

(56) References Cited

U.S. PATENT DOCUMENTS

| | | | | |
|---|---|---|---|---|
| 1,502,343 A | * | 7/1924 | MacPherson | H01G 13/00 100/265 |
| 1,505,600 A | * | 8/1924 | Greenleaf | H01G 4/22 100/315 |
| 1,652,212 A | * | 12/1927 | Priess | H01G 4/38 264/229 |
| 3,214,657 A | * | 10/1965 | Davis | H01G 4/015 361/273 |
| 4,106,068 A | * | 8/1978 | Flanagan | H01G 2/14 361/15 |
| 4,453,197 A | * | 6/1984 | Burrage | H01F 27/02 174/17 LF |
| 6,014,308 A | * | 1/2000 | Stockman | H01G 4/221 361/301.5 |
| 6,048,618 A | | 4/2000 | Berger et al. | |
| 9,035,739 B2 | * | 5/2015 | Boe | H01H 85/0021 337/186 |

(Continued)

FOREIGN PATENT DOCUMENTS

| | | |
|---|---|---|
| CA | 2598754 A1 | 4/2008 |
| WO | WO 2012042835 A1 | 4/2012 |
| WO | WO 2013011614 A1 | 1/2013 |

OTHER PUBLICATIONS

European Office Action for European Application No. 13197486.7 mailed Dec. 16, 2013.

*Primary Examiner* — Dion R Ferguson
(74) *Attorney, Agent, or Firm* — Lempia Summerfield Katz LLC

(57) ABSTRACT

A method for treating a capacitor for healing faults therein includes: applying a voltage between a first electrode and a second electrode of the capacitor to charge the capacitor at a start pressure; and pressurizing a non-conductive fluid surrounding the capacitor to a target pressure while the voltage is applied.

23 Claims, 1 Drawing Sheet

(56) References Cited

U.S. PATENT DOCUMENTS

| | | | |
|---|---|---|---|
| 2006/0227495 A1* | 10/2006 | Stockman | H01G 2/24 361/328 |
| 2010/0208415 A1* | 8/2010 | Bo | H01G 2/103 361/521 |
| 2011/0164344 A1 | 7/2011 | Bø et al. | |

* cited by examiner

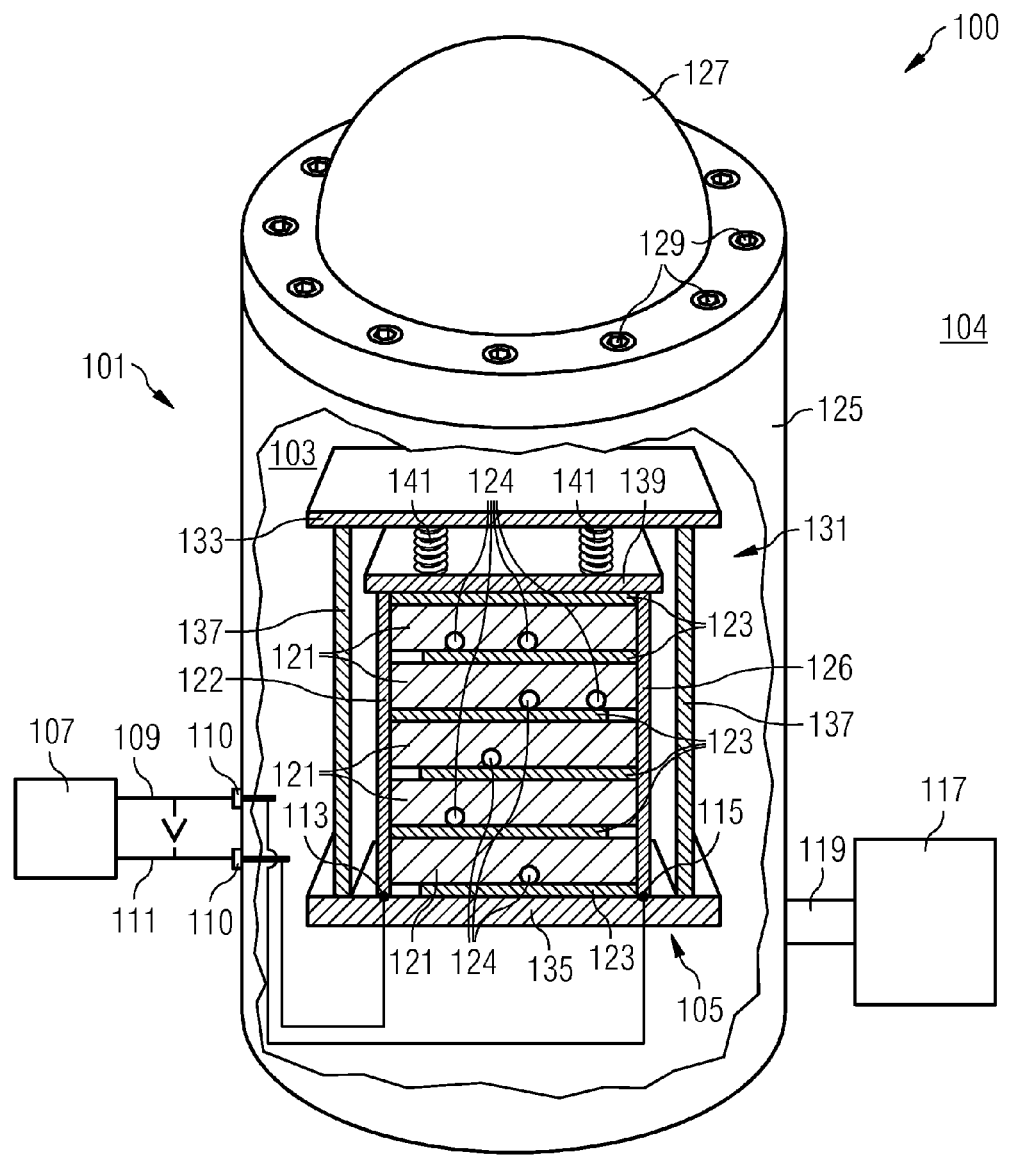

REMOVING FAULTS FROM A SELF-HEALING FILM CAPACITOR

RELATED APPLICATIONS

This application claims the benefit of European Patent Application No. EP 13197486.7, filed Dec. 16, 2013. The entire contents of the priority document are hereby incorporated herein by reference.

TECHNICAL FIELD

The present teachings relate generally to methods and apparatuses for treating a capacitor (e.g., a self-healing film capacitor) for healing faults. In some embodiments, the capacitor is used in subsea applications.

BACKGROUND

A power grid may be operated at a sea ground or subsea. A power grid may include an adjustable speed drive (ASD) with one or more power cells that may have a DC-link capacitor as a component. Each power cell may contain a large DC-link capacitor. In a subsea application, smaller capacitors may be used for power supply and circuit boards. In a subsea application or subsea power grid, components (including the power cell in the subsea ASD) may be located in a pressure-compensated oil volume (e.g., contained within a vessel or enclosure). The phrase "pressure-compensated" signifies that the pressure inside the vessel is balanced to the ambient pressure. The ambient pressure (e.g., outside the vessel or enclosure) may be very high (e.g., 50 bar to 400 bar) but the differential pressure (e.g., between the inside and outside of the vessel or enclosure) may be relatively low (e.g., 0.1 bar to 2.0 bar, or about 1 bar). Thus, the components of the ASD or other components of the subsea application may be exposed to the same ambient pressure as the water pressure surrounding the subsea power grid. A subsea application may take place at a depth of about 3000 m below sea level. At this depth, a pressure of about 300 bar prevails. Therefore, components to be used in subsea applications may have to withstand and operate properly at this pressure.

Self-healing film capacitors have a low dissipation factor and are used, for example, on circuit boards. Self-healing film capacitors are suitable for high current pulses. Such high current pulses may occur, for example, when capacitors are used in snubber circuits for semiconductor applications.

Film capacitors may include faults that hamper the operation thereof. Therefore, in accordance with a standard manufacturing process for a self-healing film capacitor, a self-healing act may be performed. The manufacturing stages may be roughly categorized as: metalizing, film slitting, winding, flattening (e.g., for flat windings) or cutting (e.g., for stacked windings), and contact layer application (e.g., "shoopage"). After the above-described process stages, the manufactured capacitors may have produced defects in the dielectric film or metallization (e.g., defects, weaknesses, pinholes and flaws). In addition, foreign or undesired particles may be trapped between film layers, or there may be production inaccuracies in the dielectric film or metallization layer. Conventionally, a healing process is performed in order to clear manufacturing faults.

Conventional healing processes for healing a capacitor (e.g., a self-healing film capacitor) may not be of sufficient accuracy or reliability for all conditions, such as for preparing capacitors for subsea applications.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in some embodiments, a method for treating a capacitor for healing faults is provided that includes applying a voltage between a first electrode and a second electrode of the capacitor to charge the capacitor at a start pressure and, afterwards, pressurizing a non-conductive fluid (e.g., a fluid that does not conduct an electrical current, such as an electrically-insulating fluid or dielectric fluid) surrounding the capacitor to a target pressure while the voltage is applied.

The method may also be used for any circuits or circuit boards containing self-healing film capacitors.

The capacitor may be treated using the method either before the capacitor is assembled into a subassembly, or after the capacitor is assembled (e.g., such as when the capacitor is mounted in a power cell or a circuit board).

The method may be performed in a manufacturing facility or at another location on earth (e.g., above sea level such that the ambient air pressure is substantially the atmospheric air pressure). The capacitor may be a self-healing film capacitor. In some embodiments, the capacitor may include a film (e.g., including or made of polypropylene and/or polyester (PET) and/or polyethylene naphthalate (PEN) and/or polyphenylene sulfide (PPS)) having a thickness between 0.5 μm and 20 μm and, in some embodiments, between 2 μm and 10 μm. On one side, a metal layer is deposited onto the film (e.g., by vacuum deposition or spraying). The capacitor may be manufactured by using one (or, in some embodiments, two) of the metalized film (or metal spray film) and winding the film(s) up on a large wheel or a large cylinder. Sections may or may not be cut from the wound multiple layers of the film. The sections may or may not be flattened or straightened in order to obtain a stack of parallel layers. During the coating of the film with metal (e.g., an alloy or a pure metal element, in some embodiments aluminum deposit), partial local penetration of the film by the metal may occur. Thus, the raw manufactured capacitor may include faults that may lead to an electrical connection between two metal layers on the film that are to be isolated from each other by the film.

To remove faults within the capacitor, the voltage is applied between the first electrode and the second electrode of the capacitor. The application of the voltage is performed at a start pressure either in air or in the non-conductive fluid surrounding the capacitor. A healing process is initiated that includes energizing the capacitor such that self-healing events may occur. The energizing involving application of the voltage may employ AC and/or DC voltage in any order. The production faults or defects may lead to small short-circuits between the layers of the capacitor. The short-circuits may clear or remove the defects by self-healing events. The self-healing events may thereby reduce the number of faults or defects.

After applying the voltage at the start pressure, a non-conductive fluid surrounding the capacitor is pressurized to a target pressure while the voltage is constantly being applied.

The metal layers adjacent to each other are compressed so that the relative distance between the layers is reduced. Additional faults that were not seen at the start pressure may arise and may be cleared since small short-circuits may occur. The method avoids the occurrence of too many faults or defects at the very beginning of the healing procedure since initially the voltage is applied at a start pressure that is much lower than the target pressure. The original polypropylene film may be covered in an irregular manner with deposited metal (e.g., vacuum-deposited), such as deposited aluminum (Al). The aluminum particles reach up or penetrate into the film to different levels within the film. Depending on an applied pressure to the film metal layer structure, there may be a pressure-dependent number of aluminum particles that reach through or almost through the film in the thickness direction. The higher the pressure, there are more particles of the metal layer on the film that may reach through the film causing a short-circuit with an adjacent metal layer. When increasing the pressure during the pressurizing of the non-conductive fluid, further defects may evolve in a pressure-dependent fashion. Depending on the pressure, the evolved defects or faults may be cleared by the respective short-circuit since the voltage is continuously applied. The defects that may eventually be present at the target pressure may gradually be removed in a stepwise or continuous fashion by increasing the pressure of the non-conductive fluid while the capacitor is charged due to the applied voltage.

By applying the voltage when the capacitor is at the start pressure, the occurrence of too many short-circuits due to too high a number of faults may be avoided. Too many short-circuits may render self-healing unfeasible or may even prevent self-healing of the capacitor.

Conventionally-treated self-healing capacitors that were conventionally treated in a self-healing procedure have a very high failure rate when the capacitors are energized at high ambient pressure. The failure rate may increase with increasing capacities of the capacitors since the capacitors are formed by parallel, connected smaller capacitors. For capacitors as large as 20 mF that have a rated voltage of up to 1000 V, a failure rate of 80-100% may be observed when the capacitors are treated in a conventional process that involves energizing the capacitors at high ambient pressure.

In accordance with the present teachings, the capacitor is prepared so that the capacitor will not fail in pressurized environments. For example, the capacitor is prepared to operate in pressurized environments (e.g., in subsea applications).

The reason for the high failure rate of conventionally-treated capacitors when the capacitors are energized at high ambient pressure may be that production defects are still present in the capacitor even after the healing process is completed. The defects do not significantly influence the capacitor when the capacitor operates at atmospheric pressure. When the capacitor is pressurized (e.g., in the non-conductive fluid), the metalized dielectric film is compressed. Any flaws, inaccuracies, and foreign particles trapped between the metalized layers of dielectric film may then be forced closer to the adjacent or coinciding metalized layer. As a result, there may be a reduction of the voltage withstand capabilities of the capacitor and, in some cases, the capacitor may short-circuit completely. If the capacitor is charged at this stage, the capacitor will likely not heal, but rather suffer a catastrophic non-healing failure. Thus, in accordance with the present teachings, the capacitor may be charged at the start pressure (e.g., a relatively low pressure) so that self-healing may still occur.

In some embodiments, the start pressure is between 0.1 bar and 40 bar and, in some embodiments, between 1 bar and 10 bar. In some embodiments, the target pressure is between 250 and 350 times as high as the start pressure.

The target pressure may be a pressure that prevails at a depth between 400 m and 3500 m below sea level. Thus, by treating the capacitor in accordance with the present teachings, the capacitor flaws or defects may be reduced or removed, such that the capacitor may be operated 400 m to 3500 m below sea level.

In some embodiments, the target pressure is between 50 bar and 1000 bar, in some embodiments between 100 bar and 500 bar, and in some embodiments between 250 bar and 350 bar. In some embodiments, a capacitor operable in a pressurized environment of at least 300 bar pressure rating may be used. In order to obtain a safety margin, the capacitor may need to withstand pressures higher than the pressure rating. Accordingly, the target pressure may, for example, be between 300 bar and 500 bar.

In some embodiments, the pressurizing of the non-conductive fluid includes increasing the pressure of the non-conductive fluid from the start pressure to the target pressure in a gradual manner. During the pressurizing, the pressure of the non-conductive fluid increases at a rate of between 1 bar per minute and 10,000 bar per minute, in some embodiments between 50 bar per minute and 200 bar per minute, and in some embodiments at about 100 bar per minute. The rate may be chosen such that all defects/faults showing up at a particular pressure (e.g., during increasing the pressure) may heal before the pressure is further increased. A self-healing event may take only one microsecond or even less.

The increase of the pressure may be in multiple stages or may be in a continuous fashion (e.g., in accordance with a straight line). At every pressure value, short-circuits associated with the pressure value may occur, thereby resulting in self-healing processes. The self-healing processes may have a relatively short time constant and may be completed, for example, in less than between 1 micro second and 30 seconds or, in some embodiments, between 1 second and 60 seconds. A relatively high pressure-increase rate may be applied without hampering the self-healing process or the self-healing processes associated with the multiple pressures that the capacitor is exposed to.

In some embodiments, the non-conductive fluid having the start pressure is in communication with an atmospheric air pressure.

In some embodiments, the method may be performed in a factory on the surface of the earth. The capacitor is placed in a vessel having an internal space that may be open to the ambient atmospheric air at the beginning of the method. As a result, the method may be simplified.

In some embodiments, the voltage has a value between 0.5 and 1.5 of a rated voltage of the capacitor and, in some embodiments, between 300 V and 1,500 V. In some embodiments, after applying the voltage, an electric field between the first electrode and the second electrode has a value between 20 V/m and 500 V/m and, in some embodiments, between 100 V/m and 200 V/m.

A rated voltage of the capacitor may be a normal operational voltage of the capacitor (e.g., a voltage that the capacitor may be operated continuously at over prolonged time periods, such as between 1 day and several years).

In some embodiments, the voltage may not be so large that the capacitor is damaged or destroyed to a major degree.

In some embodiments, the capacitor has a film (e.g., two films) as a dielectric layer. The film may have a thickness between 1 m and 20 m. The film may include propylene. A metal (e.g., aluminum) may be deposited (e.g., vacuum deposited) on one side of the film (or films) to be used as at least one of the first electrode and the second electrode.

Thus, manufacturing of the capacitor may be simplified and conventionally available materials may be employed.

In some embodiments, the method for treating the capacitor further includes maintaining the charged capacitor for a predetermined time interval (e.g., between 1 second and 10 minutes) while exposed to the target pressure to allow healing of faults to complete.

Thus, flaws or defects still remaining in the capacitor may be completely removed.

In some embodiments, the treatment method further includes, in any order, depressurizing the non-conductive fluid (e.g., to the start pressure) and discharging the capacitor. The non-conductive fluid may be depressurized and then the capacitor discharged or vice versa.

After depressurizing the non-conductive fluid and discharging the capacitor, the capacitor may, for example, be released from the manufacturing facility and transported to an application site. The capacitor may be placed within a vessel or assembly enclosure (e.g., a final assembly enclosure) and lowered in the sea to the sea ground. As the high-pressure vessel containing the capacitor is lowered, the inside pressure may be increased to be equal to the outside water pressure at the respective depth within the sea (e.g., by a pressure compensator that provides pressure balancing between the inside pressure and ambient outside pressure). The enclosure may be filled with a dielectric fluid (e.g., a dielectric liquid).

Below sea level or at subsea, the capacitor may be used in a normal operation (e.g., as a part of a power cell of an adjustable speed drive (ASD)). The ASD may include a plurality of power cells arranged in a pressure-compensated enclosure. Some or each of the power cells may include the capacitor. The ASD may be part of a subsea utility grid.

In some embodiments, the method is performed while the capacitor is assembled in a power cell. In some embodiments, the non-conductive fluid (e.g., a dielectric fluid, in some embodiments a dielectric liquid, in some embodiments Castrol Brayco Micronic SBF and/or Envirotemp 200 Fluid and/or 3M Fluorinert and/or 3M Novec) may include an ester-based dielectric fluid (e.g., MIDEL 7131).

The MIDEL 7131 fluid is manufactured by M&I Materials Ltd., (Manchester, United Kingdom). The MIDEL 7131 fluid conforms to IEC 61099 "Specifications for unused synthetic organic esters for electrical purposes," and is classified as a type T1, halogen-free pentaerythritol ester.

In some embodiments, the capacitor has a capacity between 1 pF and 100000 F, in some embodiments between 100 F and 2500 F. The capacitor may be used in a DC-link of a power cell (e.g., of a subsea utility grid).

In some embodiments, the method further includes applying opposing forces on the first electrode and the second electrode of the capacitor. The opposing forces may be generated by at least one spring As a result, delamination or the occurrence of wrinkles in the film (or films) of the capacitor may be avoided. The opposing forces may be applied using a spring force in order to control the value of the opposing forces, thereby maintaining the integrity of the capacitor.

In some embodiments, the opposing forces may lead to a directed pressure having a value between 0.2 bar and 10 bar.

The directed pressure generated by the opposing forces may be lower than the hydrostatic pressure corresponding to the target pressure of the non-conducting fluid. As a result, the healing process may not be negatively affected.

It should be understood that features—individually or in any combination—that are described herein in relation to a method for treating a capacitor in accordance with the present teachings may likewise be applicable—individually or in any combination—in an apparatus for treating a capacitor in accordance with the present teachings and vice versa.

In some embodiments, an apparatus for treating a capacitor for healing faults is provided. The apparatus includes a vessel containing a non-conductive fluid configured to surround the capacitor when the capacitor is arranged within the vessel; a voltage source configured to apply a voltage between a first electrode and a second electrode of the capacitor to charge the capacitor at a start pressure of the non-conductive fluid; and a pressurizing system configured to pressurize the non-conductive fluid surrounding the capacitor to a target pressure while the voltage is applied.

The capacitor may not itself be a part of the apparatus. The vessel may have a cylindrical shape. The capacitor may be mounted or mountable in a frame that may be configured to generate the opposing forces (e.g., by a spring). Mounted within the frame, the capacitor may be positioned within the vessel. The pressuring system may include one or more compressors. The vessel may include one or more ports or connectors configured for connecting the compressors to the vessel for compressing the non-conductive fluid within the vessel. The apparatus may further include a control system that may be configured to increase the pressure within the vessel as desired. For example, the pressure may be increased in a gradual manner, in a stepwise manner, or in a continuous (e.g., linear) manner. The control system may be configured to select such a pressure that a healing method in accordance with the present teachings may be carried out by the apparatus. Increasing the pressure within the vessel may be sufficiently slow such that flaws or defects associated with a certain pressure may be healed.

In some embodiments, the vessel includes metal walls and a first electrical connector and a second electrical connector configured to carry the voltage from the voltage source outside the vessel to the capacitor electrodes arranged within the vessel.

Thus, the apparatus (e.g., the voltage source) may be simplified.

In some embodiments, a method of manufacturing a capacitor for use in a pressurized environment is provided. The method includes the acts of providing a capacitor and treating the capacitor with any of the above-described methods. A capacitor that is suitable for operation in a pressurized environment (e.g., a subsea environment) may thus be produced. The capacitor may, for example, be operated inside a pressure-compensated enclosure, wherein the internal pressure is balanced to the external pressure. The capacitor may be located in a pressurized environment when the pressure-compensated enclosure is installed at a subsea location close to the ocean floor. By treating the capacitor as described above, malfunction of the capacitor may be avoided when the capacitor is operated in the pressurized environment.

In some embodiments, a capacitor is provided for use in a pressurized environment (e.g., a subsea environment, such as the above-described pressure-compensated enclosure). The capacitor may be manufactured in accordance with the above-described method.

Various embodiments in accordance with the present teachings have been described in reference to different subject matters. For example, some embodiments have been described in reference to methods, whereas other embodiments have been described in reference to apparatuses. However, it is to be understood that, unless other indicated, any combination of features belonging to one type of subject matter or any combination between features relating to different subject matters (e.g., between features of a method and features of an apparatus) may be made and falls within the scope of the present disclosure.

BRIEF DESCRIPTION OF THE DRAWING

FIG. 1 shows a schematic illustration of an exemplary apparatus for treating a capacitor for healing faults in accordance with the present teachings.

DETAILED DESCRIPTION

The apparatus 100 in FIG. 1 includes a vessel 101 containing a non-conductive fluid 103. The non-conductive fluid 103 surrounds a capacitor 105 that, in the example shown in FIG. 1, is a self-healing film capacitor. The apparatus 100 further includes a voltage source 107 that is configured to generate a voltage V between first terminal 109 and second terminal 111, and to apply the voltage (e.g., via connectors 110) to a first electrode 113 and a second electrode 115 of the capacitor 105, thereby charging the capacitor 105. The apparatus 100 further includes a pressurizing system 117 that is connected via a port 119 to the interior of the vessel 101 in order to pressurize the non-conductive fluid 103 in the vessel 101 from a start pressure p1 (e.g., when the interior of the vessel 101 is in communication with the air pressure 104 outside the vessel) to a target pressure p2. The capacitor 105 includes stacked dielectric layers 121 having metal layers 123 deposited thereon. The metal layers 123 are alternately connected either to a left conductor 122 to which the first electrode 113 is connected or to a right conductor 126 to which the second electrode 115 is connected. Thus, starting from the upper most layer 123, every other metal layer 123 is connected to the first electrode 113. However, the metal layers in between two of the metal layers connected to the first electrode 113 are not connected to the first electrode 113. Conversely, starting from the second upper most layer 123, every other metal layer 123 is connected to the second electrode 115. However, the metal layers in between two of the metal layers connected to the second electrode 115 are not connected to the second electrode 115.

During application of a method for treating the capacitor 105 in accordance with the present teachings, the apparatus 100 applies a voltage V between the first electrode 113 and the second electrode 115 of the capacitor to charge the capacitor at a start pressure p1. The defect or faults 124 may be cleared or removed or reduced. The non-conductive fluid 103 is pressurized (e.g., the pressure of the non-conductive fluid 103 is increased) using the pressurizing system 117 while the fluid 103 surrounds the capacitor to reach a target pressure p2, and while the voltage V is being applied between the first electrode 113 and the second electrode 115. Further defects or faults 124 may be cleared or removed or reduced at the increased pressure. The pressurizing system 117 may continuously increase the pressure of the non-conductive fluid 103 within the vessel 101, thereby continuously healing additional faults 124.

The vessel 101 includes metal walls 125 having a cylindrical shape that are closed by a cap 127 using screws 129. The vessel 101 may withstand a pressure of about 300 bar at a depth of about 3000 m below sea level.

In the example shown in FIG. 1, the capacitor 105 is mounted in a frame 131 that includes a fixed stiff plate 133, a fixed stiff plane plate 135, connecting bars 137, and a movable stiff plane plate 139 that presses against the upper side of the capacitor 105. An insulating layer (not shown) between the fixed plate 135 and the first electrode 113 electrically disconnects the electrode 113 from the spring 141. Furthermore, the fixed plate 135 supports the bottom side of the capacitor. An insulating layer (not shown) between the plate 139 and the second electrode 115 electrically disconnects the electrode 115 from the plate 139. Springs 141 are placed between the fixed stiff plate 133 and the movable plate 139 to apply a spring force in opposite directions between the movable plate 139 and the fixed plate 135 in order to compress the stack of dielectric films 121 and metal layers 123. The frame 131 mounts the capacitor 105, such that delamination or evolvement of wrinkles is reduced or prevented.

In some embodiments, the capacitor 105 may not be mounted in a frame 131 during the healing process but rather may be supported without applying directed pressure in opposing directions on electrodes of the capacitor.

In some embodiments, a pressure healing process may include one or more of the following acts:

First, the capacitor may be energized with either AC voltage or DC voltage. In some embodiments, a DC voltage is recommended for energizing and charging the capacitor. The applied voltage V may be high enough that self-healing events may occur. The exact voltage may depend on the capacitor design (e.g., dielectric film material and voltage rating, etc.). A DC voltage equal to the rated capacitor voltage has successfully been tested. Healing in atmospheric pressure is performed at about 1.5 times the rated voltage of the capacitor.

Second, the capacitor may be placed into the fluid-filled pressure vessel 101 and pressurized gradually to the design or target pressure (e.g., plus a desired pressure safety margin) while the capacitor is still energized (e.g., the voltage V is still continuously being applied).

A pressure gradient of 100 bar/minute has successfully been tested. Pressure gradients of less than 100 bar/min may unproblematic. Pressure gradients higher than 100 bar/min may not be problematic due to the fact that the self-healing events have a relatively short time constant.

Third, the desired pressure may be maintained for some time while the voltage is still applied. Times between 0 minutes and 10 minutes have successfully been tested. The desired pressure or target pressure may also be maintained for longer than 10 minutes but this may be unnecessary.

Fourth, the capacitor may be depressurized and discharged although the order of these acts is immaterial.

The pressure healing process in accordance with the present teachings may be performed as a part of the capacitor manufacturing process or may be performed after the capacitor has been assembled into an assembly (e.g., a power cell). By first energizing the capacitor (or applying the voltage), the capacitor may contain enough energy to clear any internal faults that are present at atmospheric or relatively low pressure (e.g., the start pressure), or to clear any faults that appear over time.

Due to production inaccuracies, the flaws may be of unequal size and shape. When pressurization occurs gradually, inaccuracies and flaws may occur to spread out in time as the capacitor is compressed. Since the capacitor is energized, the capacitor may contain energy to clear the flaw/inaccuracy as the flaw/inaccuracy occurs due to short-circuits.

The performance of a method in accordance with the present teachings has been tested and compared to a conventional method. For example, ten capacitor samples were not treated by a procedure in accordance with the present teachings but rather were first pressurized. An attempt was then made to charge the capacitor samples to the rated voltage while at the high ambient pressure (200-350 bar). Two out of the 10 capacitor samples failed catastrophically during charging.

On the contrary, in accordance with the present teachings, 50 capacitor samples of different designs (125 μF-1670 μF) were treated with a method for treating a capacitor for healing faults in accordance with the present teachings. None of the samples later failed when the samples were charged to the rated voltage. Several different design pressures have been tested successfully from 50 bar up to 530 bar. Pressurization rates have been on the order of 100 bar/min.

Several different capacitor designs have been tested successfully. Voltage rating has ranged from 375 V up to 1300 V (DC), and capacitance has ranged from 125 μF up to 1670 μF.

As used herein, the term "comprising" does not exclude other elements or steps, and the indefinite article "a" or "an" does not exclude a plurality. As noted above, elements described in association with different embodiments may be combined.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A method for healing faults in a capacitor, the method comprising:
   applying a voltage between a first electrode and a second electrode of the capacitor to charge the capacitor at a start pressure; and
   pressurizing a non-conductive fluid surrounding the capacitor to a target pressure while the voltage is applied.

2. The method of claim 1, wherein the start pressure is between 1 bar and 10 bar, and wherein the target pressure is between 250 and 350 times as high as the start pressure.

3. The method of claim 1, wherein the target pressure is between 50 bar and 1000 bar.

4. The method of claim 1, wherein the pressurizing of the non-conductive fluid comprises gradually increasing a pressure of the non-conductive fluid from the start pressure to the target pressure, and wherein the pressure of the non-conductive fluid increases at a rate between 10 bar per minute and 1000 bar per minute during the pressurizing.

5. The method of claim 1, wherein the non-conductive fluid having the start pressure is in communication with an atmospheric air pressure.

6. The method of claim 1, wherein the voltage has a value between 0.5 and 1.5 of a rated voltage of the capacitor, and wherein after the applying of the voltage, an electric field between the first electrode and the second electrode has a value between 20 V/m and 500 V/m.

7. The method of claim 1, wherein the capacitor comprises a dielectric layer, wherein the dielectric layer comprises a film having a thickness between 1 m and 20 m, wherein the film comprises propylene, and wherein the dielectric layer further comprises a metal vacuum-deposited on one side of the film, wherein the metal is configured for use as at least one of the first electrode and the second electrode.

8. The method of claim 1, further comprising:
   maintaining the charged capacitor for a predetermined time interval at the target pressure.

9. The method of claim 1, further comprising:
   depressurizing the non-conductive fluid to the start pressure; and
   discharging the capacitor.

10. The method of claim 1, wherein the capacitor is assembled in a power cell, and wherein the non-conductive fluid comprises a dielectric liquid.

11. The method of claim 1, wherein the capacitor has a capacity between 1 pF and 100000 F.

12. The method of claim 1, further comprising:
   applying opposing forces on the first electrode and the second electrode of the capacitor, wherein the opposing forces are generated by at least one spring.

13. The method of claim 1, wherein the target pressure is between 100 bar and 500 bar.

14. The method of claim 1, wherein the target pressure is between 250 bar and 350 bar.

15. The method of claim 4, wherein the pressure of the non-conductive fluid increases at a rate of between 50 bar per minute and 200 bar per minute during the pressurizing.

16. The method of claim 4, wherein the pressure of the non-conductive fluid increases at a rate of about 100 bar per minute.

17. The method of claim 1, wherein the voltage has a value between 300 V and 1500 V, and wherein after the applying of the voltage, an electric field between the first electrode and the second electrode has a value between 100 V/m and 200 V/m.

18. The method of claim 7 wherein the metal comprises aluminum.

19. The method of claim 8 wherein the predetermined time interval is between 0 seconds and 10 minutes.

20. The method of claim 10, wherein the dielectric liquid comprises an ester-based dielectric liquid MIDEL 7131.

21. An apparatus for healing faults in a capacitor, the apparatus comprising:
   a vessel comprising a non-conductive fluid configured for surrounding the capacitor when the capacitor is arranged in the vessel;
   a voltage source configured to apply a voltage between a first electrode and a second electrode of the capacitor to charge the capacitor at a start pressure of the non-conductive fluid; and
   a pressurizing system configured to pressurize the non-conductive fluid surrounding the capacitor to a target pressure while the voltage is applied.

22. The apparatus of claim 21, wherein the vessel comprises metal walls, a first electrical connector, and a second electrical connector, wherein the first electrical connector and the second electrical connector are configured to carry the voltage from the voltage source outside the vessel to the first electrode and the second electrode within the vessel.

23. A method of manufacturing a capacitor for use in a pressurized environment, the method comprising:
   providing a capacitor;
   applying a voltage between a first electrode and a second electrode of the capacitor to charge the capacitor at a start pressure; and
   pressurizing a non-conductive fluid surrounding the capacitor to a target pressure while the voltage is applied.

* * * * *